G. E. BOYDEN.
VEHICLE SIGNALING SYSTEM.
APPLICATION FILED JULY 17, 1914.

1,168,053.

Patented Jan. 11, 1916.
6 SHEETS—SHEET 1.

WITNESSES
Patrick J. Conroy
E. B. Tomlinson

INVENTOR
George E. Boyden
BY
Browne & Woodworth
ATTORNEYS

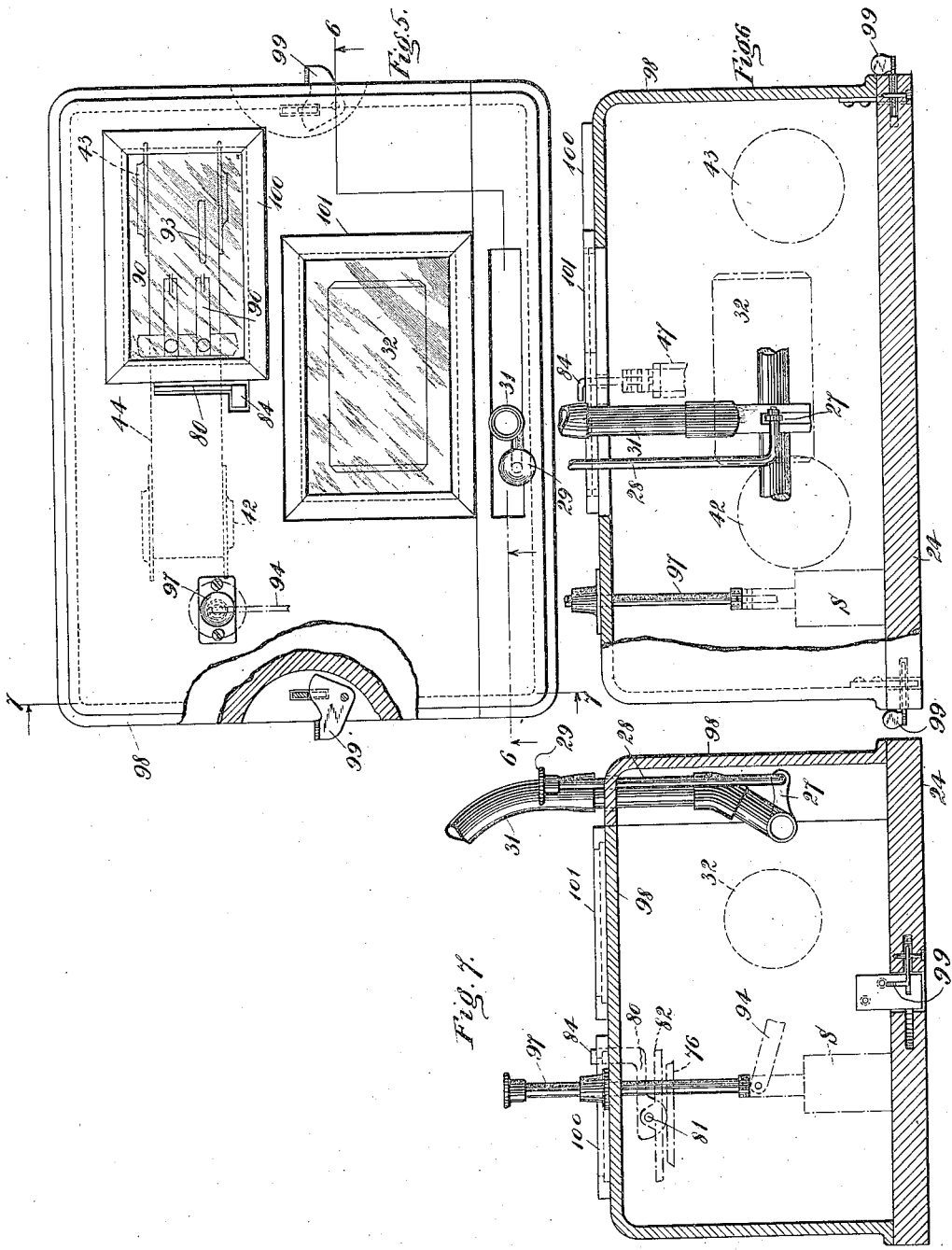

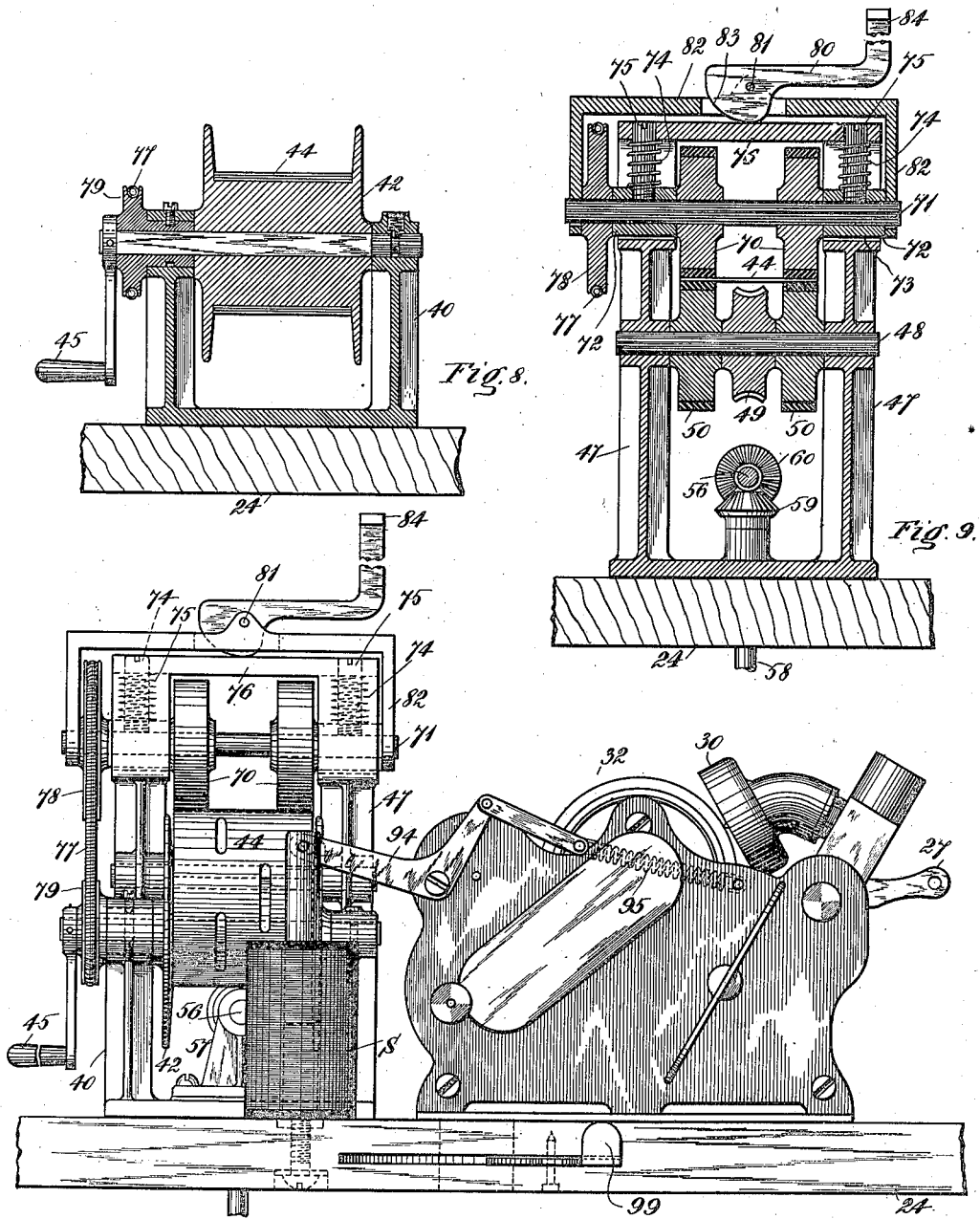

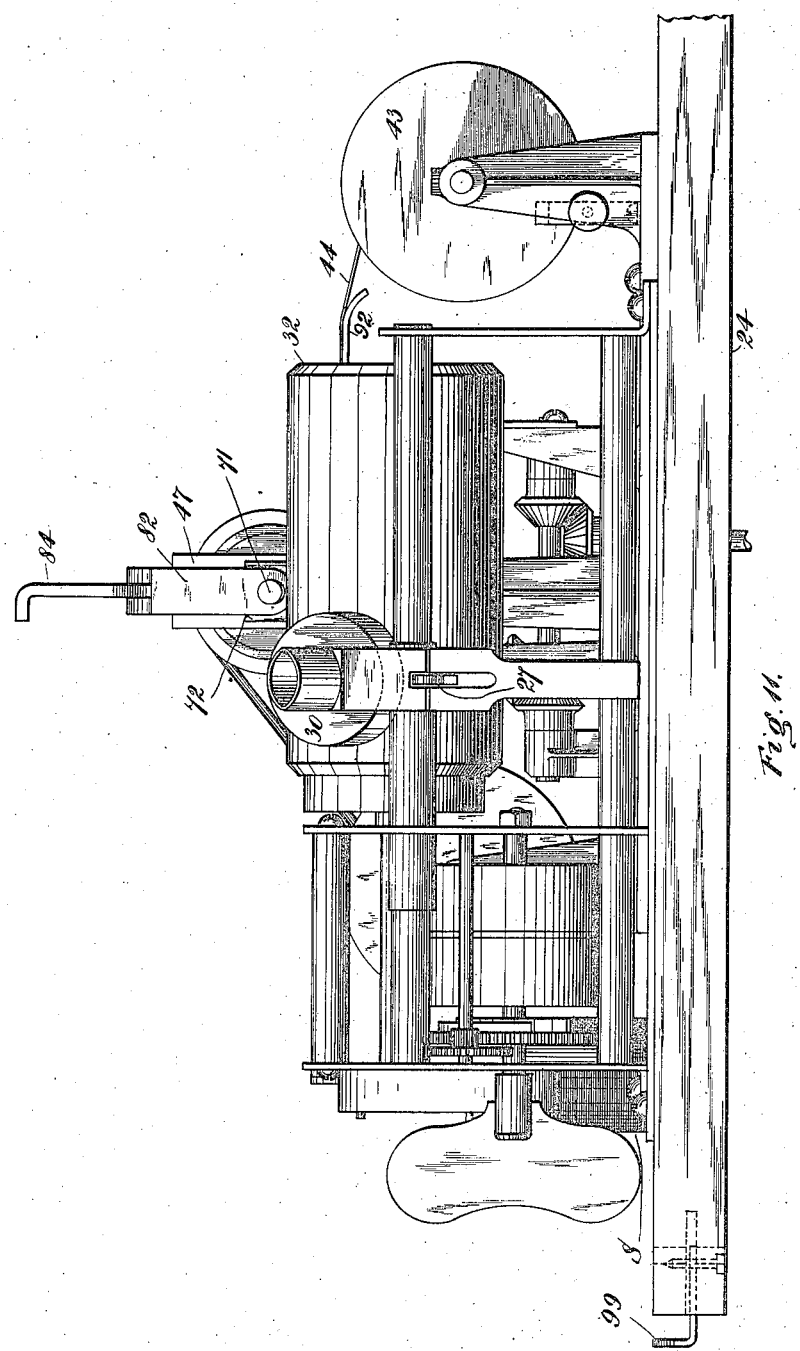

UNITED STATES PATENT OFFICE.

GEORGE E. BOYDEN, OF NEW YORK, N. Y., ASSIGNOR TO ALEXANDER P. BROWNE, TRUSTEE, OF BOSTON, MASSACHUSETTS.

VEHICLE SIGNALING SYSTEM.

1,168,053.

Specification of Letters Patent.

Patented Jan. 11, 1916.

Application filed July 17, 1914. Serial No. 851,451.

*To all whom it may concern:*

Be it known that I, GEORGE E. BOYDEN, a citizen of the United States, and a resident of New York, in the county of New York and State of New York, have invented a new and useful Improvement in Vehicle Signaling Systems, of which the following is a specification.

My invention relates to signaling apparatus for vehicles, and its object is to provide means for announcing to the driver of a vehicle such as an automobile, the directions for following a predetermined route.

An illustrative embodiment of my invention is shown in the accompanying drawings in which—

Figure 1:
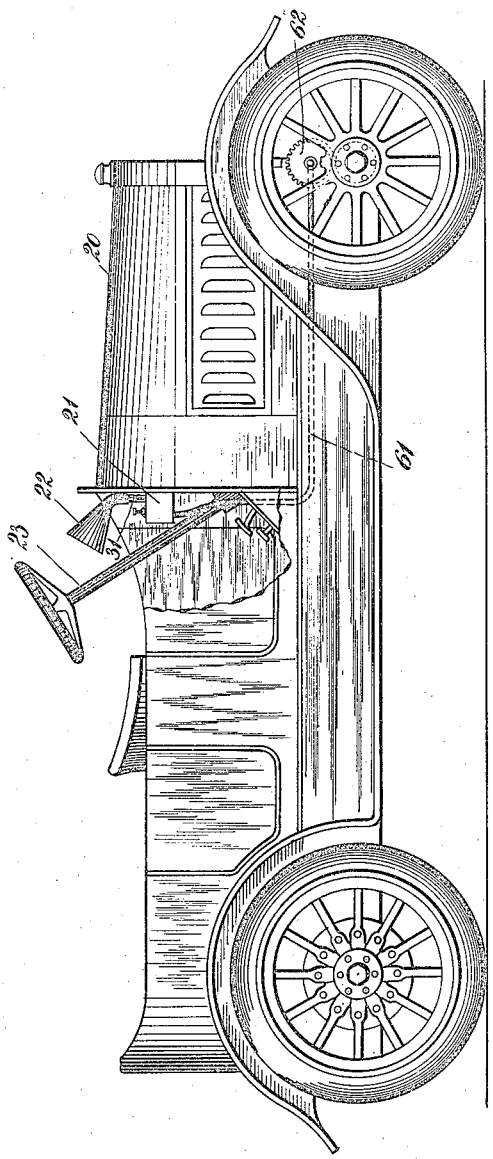
Figure 2:
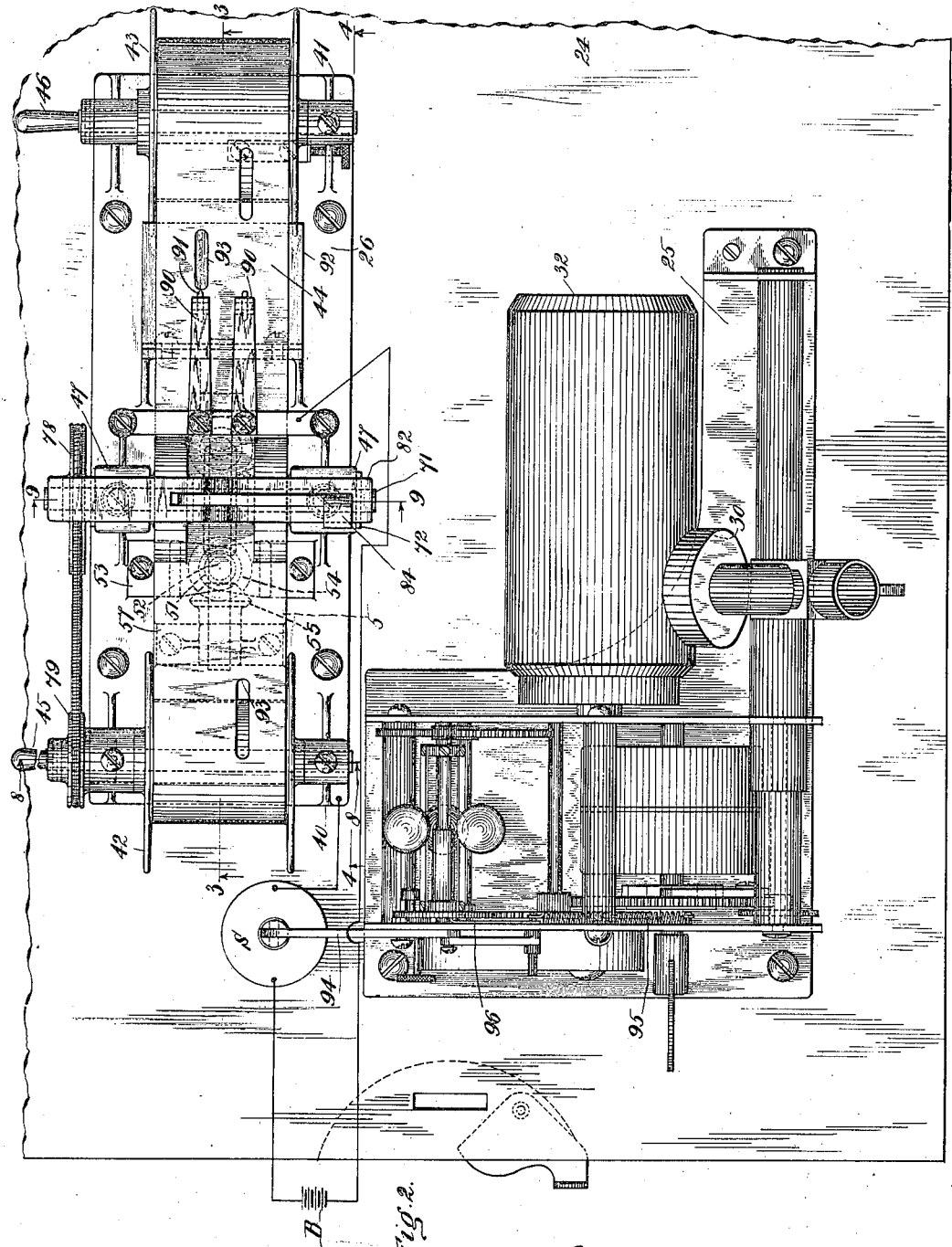
Figure 3:
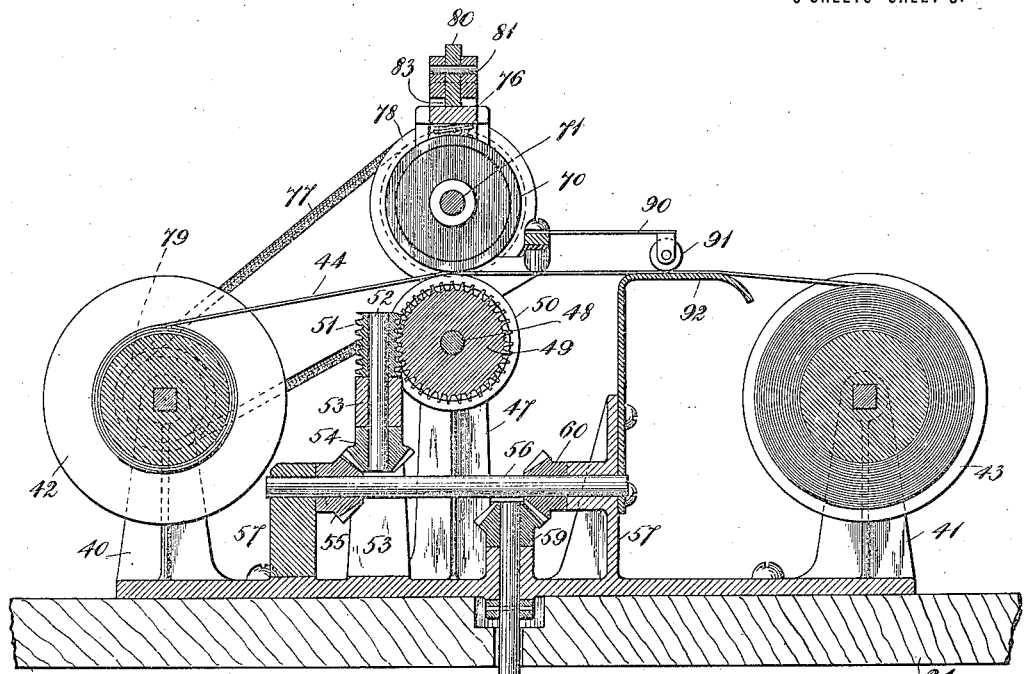
Figure 4:
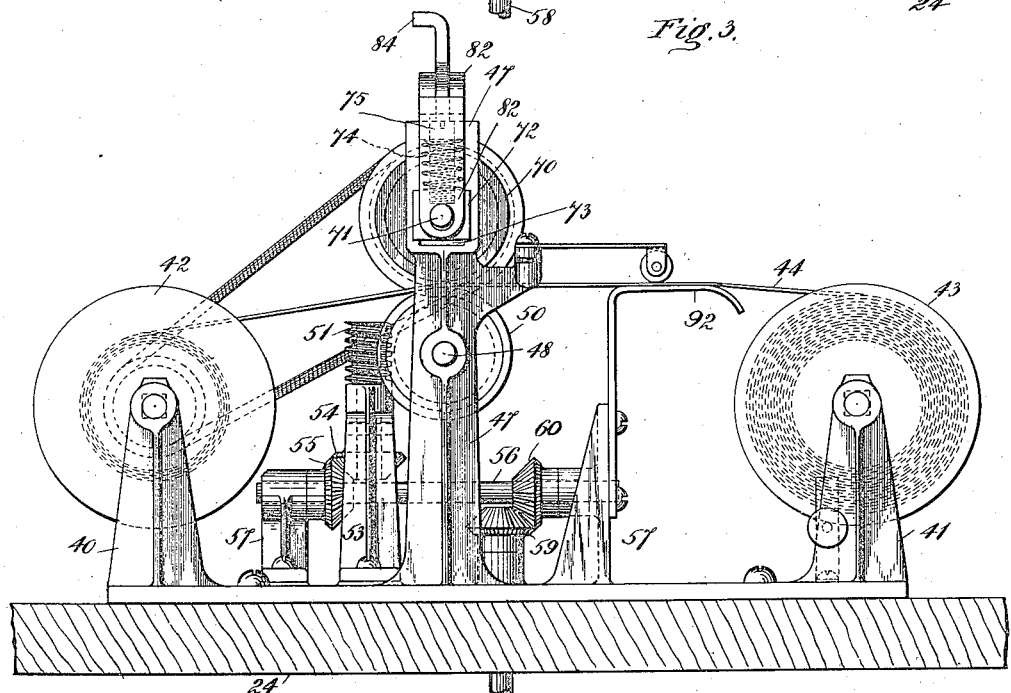

Figure 1 is a side elevation of an automobile provided with my improved apparatus. Fig. 2 is a plan view of my improvement with the casing removed. Fig. 3 is a central longitudinal section taken on the line 3—3 of Fig. 2. Fig. 4 is a side elevation, partly in section, of the phonograph-control apparatus, the section being taken on the line 4—4 of Fig. 2. Fig. 5 is a plan view of my improvement with the casing in position, certain parts being broken away to show the lock for securing the casing to its base. Fig. 6 is a section taken on the irregular line 6—6 of Fig. 5, certain parts being shown in elevation and certain other parts being omitted for the sake of clearness. Fig. 7 is a transverse section taken on the line 7—7 of Fig. 5. Fig. 8 is a transverse section of one of the web-reels taken on the line 8—8 of Fig. 2. Fig. 9 is a transverse section taken on the line 9—9 of Fig. 2. Fig. 10 is an end elevation of the apparatus shown in Fig. 2 with the casing removed. Fig. 11 is a side elevation of said apparatus.

In the particular drawings selected for more fully disclosing my invention, 20 represents an automobile having my signaling apparatus 21 secured thereto in the position in which I prefer to place it, namely, on the dash-board in proximity to the steering post 23, so that the megaphone 22 will be directly in front of the driver, although it will be understood of course that both the signaling apparatus and its megaphone may be located in any other suitable position, the megaphone, for example, being placed beside instead of in front of the driver.

Suitably mounted on a base 24 are a phonograph 25 of any suitable type and a device 26 for controlling the same, so that the talking machine at the proper times will announce the directions whereby the driver will be enabled to follow a predetermined route. Inasmuch as the mechanism of the particular talking machine shown in the drawings is well understood, I deem it unnecessary to describe the same further than to say that by means of the rod 28, provided with a push-button 29 and coupled to the link 27, the transmitter 30 may be swung back from the record cylinder 32 and moved manually along its operating shaft to any desired position. The megaphone 22 above referred to is attached to the transmittter by means of the flexible tube 31, and when the megaphone is placed beside the driver this tube may be conveniently disposed along the side of the motor car.

In the particular control apparatus shown in the drawings, reels 42, 43 are mounted on standards 40, 41, said reels being provided with handles 45, 46, whereby the web 44 may be adjusted in position as hereinafter more fully described. Located approximately midway between the reels is a pair of standards 47 in which is journaled the horizontal transverse shaft 48, which carries the worm gear 49 and the rubber-covered rollers 50. Meshing with said worm gear is a worm 51 carried by the vertical shaft 52 mounted in the standard 53 and carrying at its lower end the bevel gear 54 meshing with the bevel gear 55 carried by the longitudinal horizontal shaft 56 which is mounted in the standards 57, 57. The shaft 56 is rotated by the vertical shaft 58 and the bevel gears 59, 60 secured to the shafts 58 and 56 respectively, the lower end of the shaft 58 extending through the base 24 and being connected to the flexible shaft 61, which is rotated in the well known manner by means of a system of gearing associated with the spur gear 62 meshing with a gear connected to the car wheel, so that a definite relation exists between the speed of the car and the rotational speed of said flexible shaft. As will be obvious, the flexible shaft 61 may be the usual speedometer shaft and may pass through the speedometer and be coupled to the vertical shaft 58.

Coöperating with the rollers 50 is a pair of rollers 70, also preferably rubber-covered, which are rigidly secured to the shaft 71 mounted in the journal blocks 72 arranged for vertical movement in the boxes 73 with which the upper ends of the standards 47 are provided.

Springs 74 surrounding the studs 75, which pass through the cross-bar 76 and are threaded into the journal blocks 72, normally press the rollers 70 into contact with the lower rollers, so that by the actuation of the latter the web 44 will be drawn off the reel 43 at a rate proportional to the speed of the vehicle. The web is wound on the reel 42 actuated by the slip-belt 77 of the usual construction, which passes around the pulleys 78, 79, secured to said shaft 71 and reel 42, respectively.

In order to release the pressure exerted on the web by the rollers for the purpose of manually adjusting the web with respect to the contact-makers 90, the upper rollers may be raised against the tension of the springs 74 by means of the lever 80 which is pivoted at 81 to the yoke 82, the ends of which overhang the top of the standards 47 and inclose the ends of the shaft 71, the cam surface 83 of said lever coöperating with the cross-bar 76 in a manner that will be obvious. Preferably the upper end 84 of the lever projects through an aperture in the casing which incloses the apparatus.

One or more contact-makers 90, herein shown as two in number, preferably provided at their outer ends with metallic wheels 91 are secured to and insulated from the standard 47 and are arranged to coöperate with the platen 92 over which the web passes. The battery B is serially connected with the solenoid S and one terminal of the latter is grounded on the metallic framework so that it is in electrical connection with said platen, and the other terminal is connected to the metallic cross-bar which carries the contact-makers. The web is provided with one or more series of perforations 93, arranged in line with the contact-makers, so that whenever one of the latter passes through a perforation it will close the circuit of the battery and energize the solenoid thereby actuating the bell-crank 94 normally retracted by the spring 95 and so releasing the phonograph brake 96. For manual operation of the brake-releasing device, the push-rod 97, the lower end of which is connected with the solenoid plunger and the upper end of which projects above the casing, may be employed. Preferably the casing 98, which is secured to the base in any suitable manner, for example by the locking devices 99, is provided with windows 100, 101, arranged respectively over the contact-makers and record cylinder.

The web may be perforated by reference to a road-book, an appropriate length corresponding to a known distance being reeled off manually, a perforation, preferably elongated as shown, being made and then certain directions spoken into the receiver of the phonograph. For example, if it is desired to make a record to guide the driver from Chevy Chase to the Treasury Department, the record among other things would contain the directions "U street turn to the left", and knowing the distance between Chevy Chase and the corner of 18th and U, for example, a perforation would be made in the web a distance from its end corresponding to the distance that would be traveled from Chevy Chase to the corner in question and the desired direction spoken into the machine. From a cylinder prepared in this manner a matrix would be made for the production of permanent records. Or, the web could be perforated and the record prepared on the road, the operator stopping his machine at appropriate points, making the perforations and dictating the directions to the phonograph.

Preferably at least two sets of perforations are employed as shown to prevent undue weakening of the web. The perforations preferably should be numbered consecutively and the user will be provided with a list giving the numbers of the perforations and the corresponding recorded directions, so that at any given point on the road the phonograph transmitter may be adjusted manually by means of the push-button 29, to correspond with the particular perforation which bears the number shown by the list to designate the message in question, whereupon, by depressing the push-button 97, the record beginning with said perforation will be produced for the purpose of testing the accuracy of adjustment of the transmitter to the web. It will be obvious that by means of said push-buttons 29 and 97 and the handles 45, 46, it will be a very simple matter to position the transmitter 30 with respect to the record cylinder to correspond with the proper perforation.

Having thus described one illustrative embodiment of my invention, without however limiting myself thereto, what I claim as new and desire to secure by Letters Patent is—

1. A vehicle signaling system comprising in combination a phonograph provided with a record adapted for the reproduction of directions relating to a predetermined route to be followed by said vehicle, operating mechanism for said phonograph, and means driven by said vehicle relatively thereto at a rate proportionate to the speed thereof for intermittently controlling the operating mechanism of said phonograph whereby the proper directions are reproduced by said record at definite predetermined points along the route traveled by the vehicle.

2. A vehicle signaling system comprising in combination a phonograph provided with a record adapted for the reproduction of directions relating to a predetermined route to be followed by said vehicle, means normally restraining said phonograph from operation, electromagnetic means for releasing the restraining means and means driven by said vehicle relatively thereto at a rate proportionate to the speed thereof for controlling said electromagnet device whereby the proper directions are reproduced by said record at definite predetermined points along the route traveled by the vehicle.

3. A vehicle signaling system comprising in combination a phonograph provided with a record adapted for the reproduction of directions relating to a predetermined route to be followed by said vehicle, a perforated web, means for driving said web at a rate proportionate to the speed of the vehicle and means coöperating with said perforated web for controlling the operation of said phonograph whereby the proper directions are reproduced by said record at definite predetermined points along the route traveled by the vehicle.

4. A vehicle signaling system comprising in combination a phonograph provided with a transmitter and a record adapted for the reproduction of directions relating to a predetermined route to be followed by said vehicle, operative mechanism for said phonograph, means driven by said vehicle relatively thereto at a rate proportionate to the speed thereof for intermittently controlling the operating mechanism of said phonograph whereby the proper directions are reproduced by said record at definite predetermined points along the route traveled by the vehicle, manually operated means for controlling the operation of said phonograph at will and manually operated means for adjusting the position of the phonograph transmitter with respect to its record.

5. The combination with a vehicle, of a phonograph, control means therefor, means connected with a moving part of said vehicle for driving said control means at a rate proportionate to the speed of said vehicle, restraining means for said phonograph, and means governed by said control means for releasing said restraining means at predetermined intervals.

6. The combination with a vehicle, of a phonograph, control means therefor, means connected with a moving part of said vehicle for driving said control means at a rate proportionate to the speed of said vehicle, restraining means for said phonograph, means actuated by said control means for releasing said restraining means at predetermined intervals, and manually-operated means for releasing said restraining means at will.

7. A vehicle signaling system comprising in combination a phonograph provided with a record adapted for the reproduction of directions relating to a predetermined route to be followed by said vehicle, a perforated web, a pair of rollers frictionally engaging said web, means for rotating one of said rollers at a rate proportionate to the speed of the vehicle, and means coöperating with said perforated web for controlling the operation of said phonograph whereby the proper directions are reproduced by said record at definite predetermined points along the route traveled by the vehicle.

8. A vehicle signaling system comprising in combination a phonograph provided with a record adapted for the reproduction of directions relating to a predetermined route to be followed by said vehicle, a perforated web, a pair of rollers frictionally engaging said web, means for rotating one of said rollers at a rate proportionate to the speed of the vehicle, means for disengaging one of said rollers from said web, and means coöperating with said perforated web for controlling the operation of said phonograph whereby the proper directions are reproduced by said record at definite predetermined points along the route traveled by the vehicle.

9. A vehicle signaling system comprising in combination a phonograph provided with a record adapted for the reproduction of directions relating to a predetermined route to be followed by said vehicle, a perforated web, means for driving said web at a rate proportionate to the speed of the vehicle, a platen supporting said web, a contact-maker resting on said web in line with the perforations thereof and arranged to make electrical contact with said platen through said perforations, electromagnetic means serially connected with said contact-maker and said platen, restraining means for said phonograph and mechanical connections between said electromagnetic means and said restraining means.

10. A vehicle signaling system comprising in combination a phonograph provided with a transmitter and a record adapted for the reproduction of directions relating to a predetermined route to be followed by said vehicle, and control means for said phonograph, a casing inclosing said phonograph and control means, means for driving said control means relatively to said vehicle and at a rate proportionate to the speed thereof whereby the proper directions are reproduced by said record at definite predetermined points along the route traveled by the vehicle, manually-operated means projecting through said casing for controlling the operation of said phonograph at will, and other manually-operated means projecting through said casing for adjusting the position of the phonograph transmitter with respect to its record.

In testimony whereof, I have hereunto subscribed my name this 10th day of July, 1914.

GEO. E. BOYDEN.

Witnesses:
MORTIMER KATZ,
WILLIAM B. WRIGHTINGTON.